United States Patent
Hamzy

(10) Patent No.: US 8,180,759 B2
(45) Date of Patent: May 15, 2012

(54) SPELL CHECKING URLS IN A RESOURCE

(75) Inventor: Mark Joseph Hamzy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1636 days.

(21) Appl. No.: 10/996,321

(22) Filed: Nov. 22, 2004

(65) Prior Publication Data

US 2006/0112066 A1    May 25, 2006

(51) Int. Cl.
*G06F 17/30* (2006.01)
(52) U.S. Cl. .......................... 707/708; 707/767
(58) Field of Classification Search ................. 707/6
See application file for complete search history.

(56) References Cited

U.S. PATENT DOCUMENTS

| | | | |
|---|---|---|---|
| 5,892,919 A * | 4/1999 | Nielsen | 709/228 |
| 5,907,680 A * | 5/1999 | Nielsen | 709/228 |
| 6,041,324 A * | 3/2000 | Earl et al. | 707/9 |
| 6,092,100 A | 7/2000 | Berstis et al. | |
| 6,434,548 B1 * | 8/2002 | Emens et al. | 707/3 |
| 2002/0116411 A1 * | 8/2002 | Peters et al. | 707/501.1 |
| 2005/0235031 A1 * | 10/2005 | Schneider et al. | 709/203 |

OTHER PUBLICATIONS

U.S. Appl. No. 10/335,018, filed Dec. 31, 2002, Gurney et al.
"U.S. Appl. No. 11/771,638 Office Action", Apr. 14, 2011, 14 pages.
"U.S. Appl. No. 11/771,638 Final Office Action", Oct. 24, 2011, 15 pages.

* cited by examiner

*Primary Examiner* — Kim Nguyen
(74) *Attorney, Agent, or Firm* — DeLizio Gilliam, PLLC

(57) ABSTRACT

Methods, systems, and computer program products are provided for spell checking URLs in a resource. Embodiments include identifying within a resource a URL, determining whether the URL is valid, and marking the URL as misspelled if the URL is invalid. In typical embodiments, determining whether the URL is valid is carried out by resolving a domain name contained in the URL. Typical embodiments also include suggesting an alternative spelling for the URL. In some embodiments, suggesting an alternative spelling for the URL is carried out by identifying a keyword in the resource, querying a search engine with the identified keyword, and selecting a URL in dependence upon search results returned by the search engine.

6 Claims, 5 Drawing Sheets

SPELL CHECKING URLS IN A RESOURCE

BACKGROUND OF THE INVENTION

1. Field of the Invention

The field of the invention is data processing, or, more specifically, methods, systems, and products for spell checking URLs in a resource.

2. Description of Related Art

Many conventional spell checking applications provide dictionary functionality to identify misspelled words. Such conventional spell checkers compare words in a resource with the words in the dictionary to identify misspelled words. A word in a resource is considered misspelled if the spelling of the word does not match a word in the dictionary. Often conventional spell checkers also provide a list of suggested alternative spellings for words that are identified as misspelled. While conventional spell checkers work well when dealing with words, such applications are not sophisticated in dealing with Uniform Resource Locators (URLs). A URL often includes an internet protocol address; or a domain name that resolves to an internet protocol address, identifying a location where a resource, particularly a web page, a CGI script; or a servlet, is located on a network, usually the Internet. Because URLs are not typically included in the dictionaries of conventional spell checkers, those applications cannot determine whether a URL is misspelled. There is therefore an ongoing need for methods, systems, and computer program products for spell checking URLs in a resource.

SUMMARY OF THE INVENTION

Methods, systems, and computer program products are provided for spell checking URLs in a resource. Embodiments include identifying within a resource a URL, determining whether the URL is valid, and marking the URL as misspelled if the URL is invalid. In typical embodiments, determining whether the URL is valid is carried out by resolving a domain name contained in the URL.

Typical embodiments also include suggesting an alternative spelling for the URL. In some embodiments, suggesting an alternative spelling for the URL is carried out by identifying a keyword in the resource, querying a search engine with the identified keyword, and selecting a URL in dependence upon search results returned by the search engine.

Many embodiments also include determining whether to suggest an alternative URL if the URL is valid. In typical embodiments, determining whether to suggest an alternative URL is carried out by downloading a resource from a network address identified by URL and comparing the downloaded resource with the resource containing the URL.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for spell checking URLs in a resource. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Spell Checking URLs in a Resource

Figure 1:
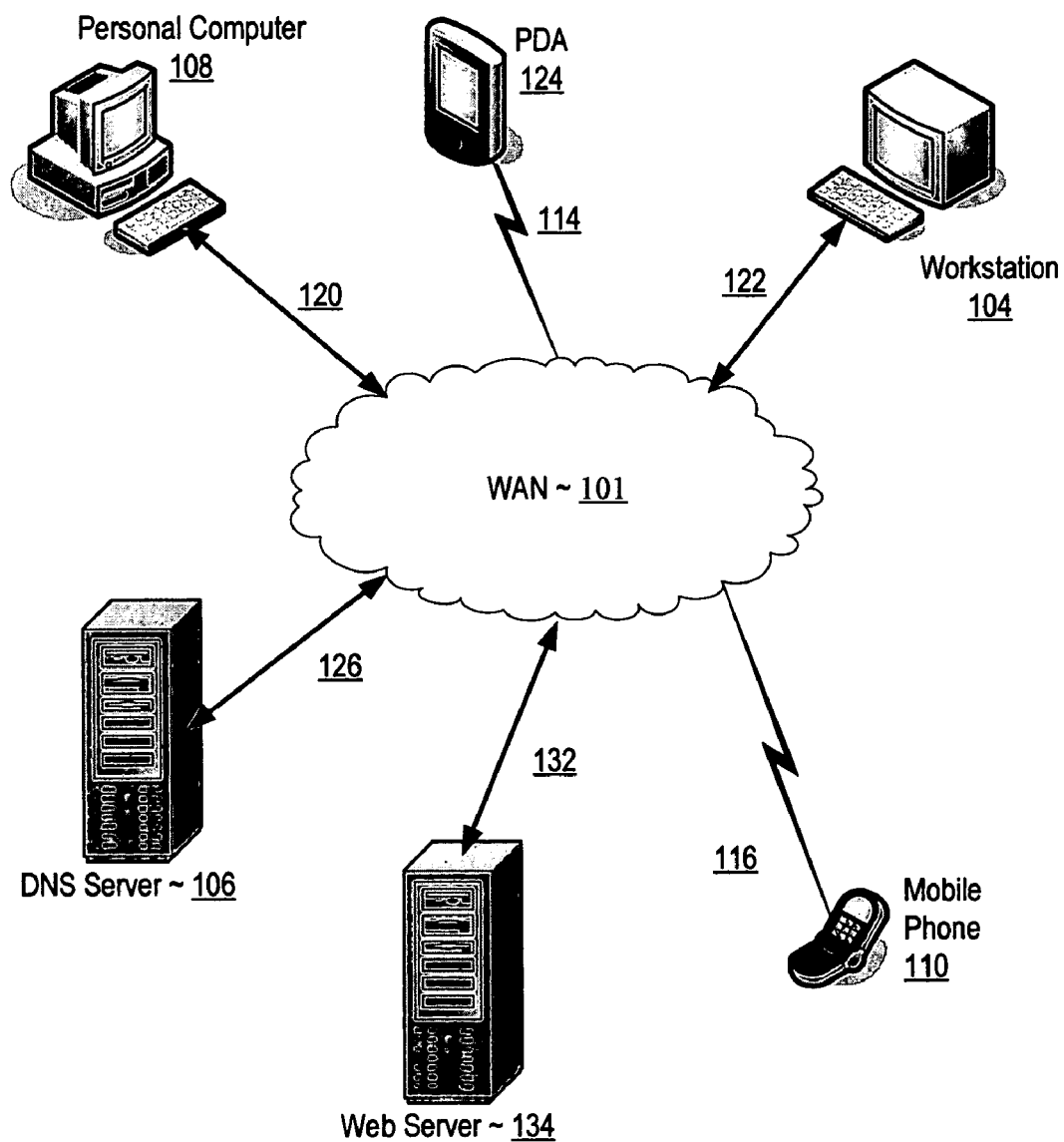
FIG. 1 depicts an exemplary data processing useful in spell checking URLs in a resource according to embodiments of the present invention.

Exemplary methods, systems, and products for spell checking URLs in a resource are now explained with reference to the accompanying drawings, beginning with FIG. 1. FIG. 1 depicts an exemplary data processing useful in spell checking URLs in a resource according to embodiments of the present invention. The system of FIG. 1 includes a number of computers (108, 124, 104, 110) connected for data communications in networks and having one or more applications capable of displaying resources containing within them a URL. Such applications include word processing applications capable of displaying word processing files, text editors capable of displaying text files, spreadsheet applications capable of displaying spreadsheets, browsers and markup language editors capable of displaying markup documents, as well as others as will occur to those of skill in the art.

Each of the computers (108, 124, 104, and 110) of FIG. 1 also has installed upon in a spell checker capable of spell checking URLs in a resource in accordance with the present invention. Spell checkers according to embodiments of the present invention can be implemented as plug-ins to conventional applications supporting spell checking functionality, as separate URL spelling checkers, or in other ways as will occur to those of skill in the art.

The data processing system of FIG. 1 includes wide area network ("WAN") (101). The network connection aspect of the architecture of FIG. 1 is only for explanation, not for limitation. In fact, systems for spell checking URLs in a resource according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, several exemplary computers capable of spell checking URLs in resource are depicted including a PDA (124), a computer workstation (104), a mobile phone (110), and personal computer (108) are connected to WAN (101). The network-enabled mobile phone (110) connects to the WAN (101) through a wireless link (116), and the PDA (112) connects to the network (101) through wireless link (114). In the example of FIG. 1, the personal computer (108) connects through wireline connection (120) to the WAN (101) and the computer workstation (104) connects through wireline connection (122) to WAN (101).

In the example of FIG. 1, the resource displayed by application programming installed on the devices (108, 124 104, and 110) contains within it a URL identifying a web page located on the web server (134). In this specification, a resource may be any computer resource whose location may be specified by a URL and that may contain within it a URL. That is, in this specification 'computer resource' or 'resource' refers to any aggregation of information identified by URL and containing a URL according to various embodiments of the present invention. In fact, the 'R' in 'URL' stands for 'resource.' Network communications protocols generally, for example, HTTP, TCP/IP, and so on, transmit resources, not just files. The most common kind of resource is a file, but resources include dynamically-generated query results as well, such as the output of CGI ('Common Gateway Interface') scripts, Java servlets, dynamic server pages, documents available in several languages, and so on.

In effect, a resource is somewhat like a file, but more general in nature. As a practical matter, most resources are currently either files or server-side script output. Server side script output includes output from CGI programs, Java servlets, Active Server Pages, Java Server Pages, and so on. The web server (134) of FIG. 1 may be any computer capable of accepting a request for a resource and responding by providing the resource to the requester. One example of such a server is an HTTP ('HyperText Transport Protocol') server or 'web server.'

The computers (108, 12, 104, and 110) of FIG. 1 have installed upon them a spell checker according to embodiments of the present invention capable of spell checking URLs in a resource by identifying within the resource a URL and determining whether the URL is valid. In the system of FIG. 1, devices (108, 12, 104, and 110) are capable of resolving a domain name contained in the URL to determine if the URL is valid. The Domain Name System ("DNS") is a name service typically associated with the Internet. The DNS translates domain names into network addresses. To resolve a domain name contained in the URL, a system routine called a 'resovler' accessible to a spell checker of the present invention submits a query to a DNS name server (106) containing the domain name identified in the URL. DNS includes a request/response data communications protocol with standard message types for resolving domain names. Gethostbyname( ) and InetAddress.getByName( ) are two examples of resolver API calls useful in resolving domain names that invoke a TCP/IP client in an operating system such as Unix or Windows. Such a TCP/IP client typically bears one or more predesignated DNS server addresses, designations of a primary DNS server for a computer and possibly one or more secondary DNS servers. In response to a call to a resolver function such as gethostbyname( ) and InetAddress.getByName( ), a TCP/IP client sends a DNS request message containing the domain name in a standard format to a predesignated primary DNS server requesting a corresponding network address. The DNS name server "resolves" the domain name to an IP address and sends the IP address back to the resolver as the "answer" to the query. The resolver passes the IP address to the calling spell checker.

In the example of FIG. 1, when the spell checker operating according to embodiments of the present invention receives the network address from the operating system, the spell checker determines that the URL identified in the resource is valid. The spell checker can also use the network address to access the resource on the network host identified by the domain name associated with the network address.

In the system of FIG. 1, if a domain name contained in the URL does not resolve to an IP address, the URL is considered to be invalid. The spell checker operating according to embodiments of the present invention is therefore also capable of marking the URL as misspelled. Marking a URL as misspelled may be carried out by highlighting the URL in a color predetermined to identify the URL as misspelled, displaying the URL in a font predetermined to identify the URL as misspelled, as well as other ways as will occur to those of skill in the art. Spell checkers according to embodiments of the present invention are also capable of suggesting an alternative spelling for the URL by identifying a keyword in the resource, querying a search engine with the identified keyword, and selecting a URL in dependence upon search results returned by the search engine.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

As mentioned above, spell checking URLs in a resource in accordance with the present invention is generally implemented with computers, that is, with automated computing machinery. For further explanation, FIG. 2 sets forth a block diagram of automated computing machinery comprising a computer (152) useful in for spell checking URLs in a resource according to embodiments of the present invention. The computer (152) of FIG. 2 includes at least one computer processor (156) or 'CPU' as well as random access memory (168) ("RAM"). Stored in RAM (168) is an operating system (154). Operating systems useful in computers according to embodiments of the present invention include Unix, Linux, Microsoft NT™, and many others as will occur to those of skill in the art. Operating system (154) in the example of FIG.

2 is shown in RAM (168), but many components of an operating system typically are stored in non-volatile memory (166) also.

Figure 2:
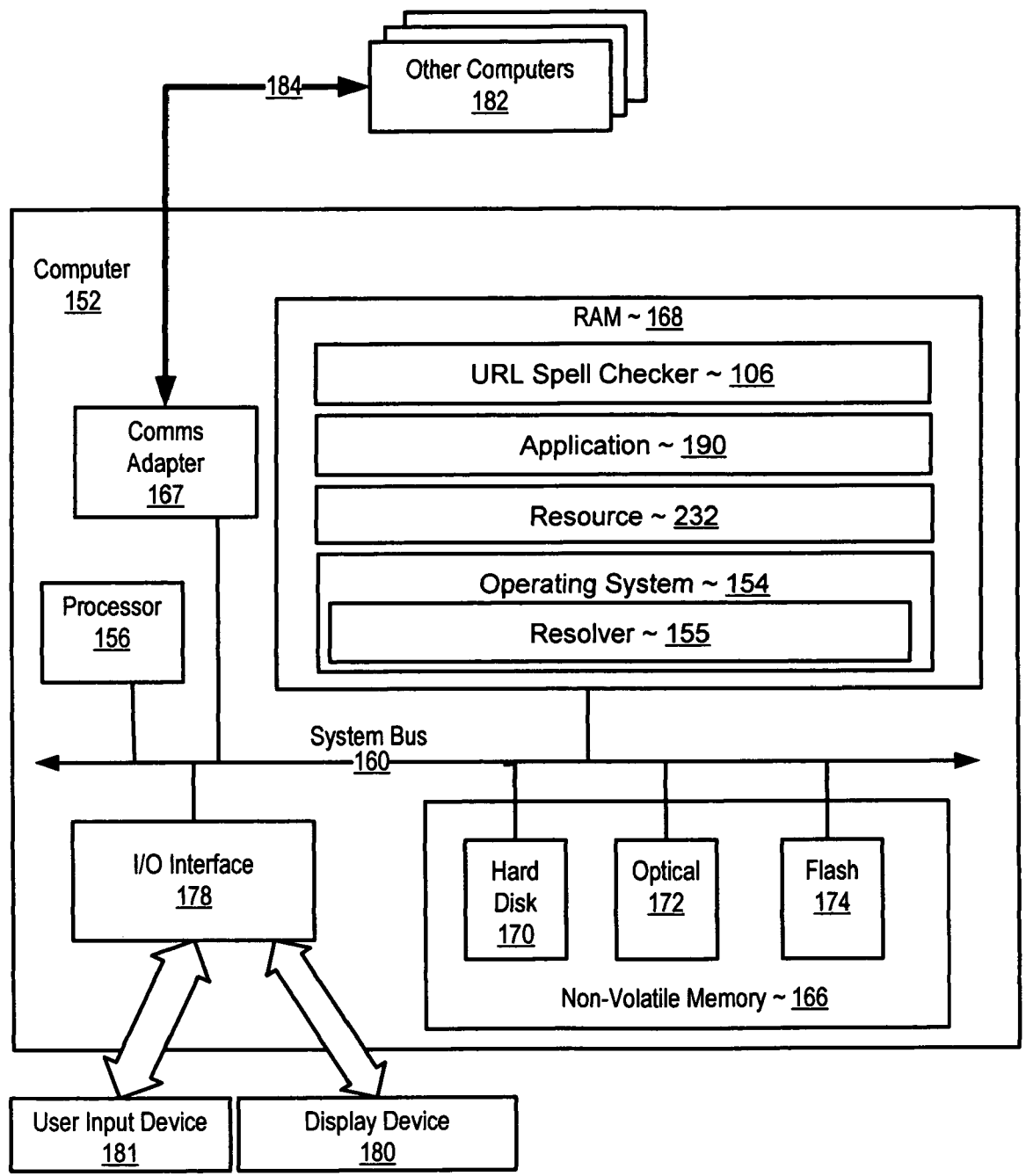
FIG. 2 sets forth a block diagram of automated computing machinery useful in for spell checking URLs in a resource according to embodiments of the present invention.

The operating system (154) of FIG. 2 also includes a resolver (155). The exemplary resolver (155) is a system routine that submits a query to a DNS name server containing the domain name identified in a URL by invoking a TCP/IP client bearing one or more predesignated DNS server addresses, designations of a primary DNS server for a computer and possibly one or more secondary DNS servers. The DNS name server "resolves" the domain name to an IP address and sends the IP address back to the resolver as the "answer" to the query.

Also stored in RAM (168) is a resource (232) containing a URL and an application (190) capable of displaying the resource. Examples of such applications include word processing applications capable of displaying word processing files, text editors capable of displaying text files, spreadsheet applications capable of displaying spreadsheets, browsers and markup language editors capable of displaying markup documents, as well as others as will occur to those of skill in the art.

Also stored in RAM (168) is a URL spell checker (106) for the application (190) capable of spell checking URLs in the resource (232) in accordance with embodiments of the present invention. The URL spell checker (106) of FIG. 2 operates generally by identifying within the resource (232) a URL and determining whether the URL is valid by resolving a domain name contained in the URL. If the URL is invalid, the URL spell checker (106) is capable of marking the URL as misspelled. The spell checker (106) of FIG. 2 is also capable of suggesting an alternative spelling for the URL if the URL is invalid by identifying a keyword in the resource, querying a search engine with the identified keyword, and selecting a URL in dependence upon search results returned by the search engine.

A URL may contain spelling mistakes and still be a valid URL. For example, a resource may contain the valid but misspelled URL http://www.imb.com rather than the also valid but correctly spelled http://www.ibm.com. The URL spell checker (106) of FIG. 2 is therefore also capable of determining whether to suggest an alternative URL even if the URL is valid by downloading a resource from a network address identified by URL and comparing the downloaded resource with the resource containing the URL (304). If the downloaded resource contains subject matter related to the resource containing the URL, the exemplary URL spell checker (106) does not suggest an alternative spelling for the URL. If the downloaded resource does not contain subject matter related to the resource containing the URL, then the exemplary URL spell checker suggests an alternative URL.

The exemplary computer (152) of FIG. 2 also includes non-volatile computer memory (166) coupled through a system bus (160) to processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary computer (152) of FIG. 2 includes a communications adapter (167) for implementing connections for data communications (184), including connections through networks, to other computers (182), including servers, clients, and others as will occur to those of skill in the art. Communications adapters implement the hardware level of connections for data communications through which local devices and remote devices or servers send data communications directly to one another and through networks. Examples of communications adapters useful for spell checking URLs in a resource include modems for wired dial-up connections, Ethernet (IEEE 802.3) adapters for wired LAN connections, and 802.11b adapters for wireless LAN connections.

The example computer of FIG. 2 also includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 3:
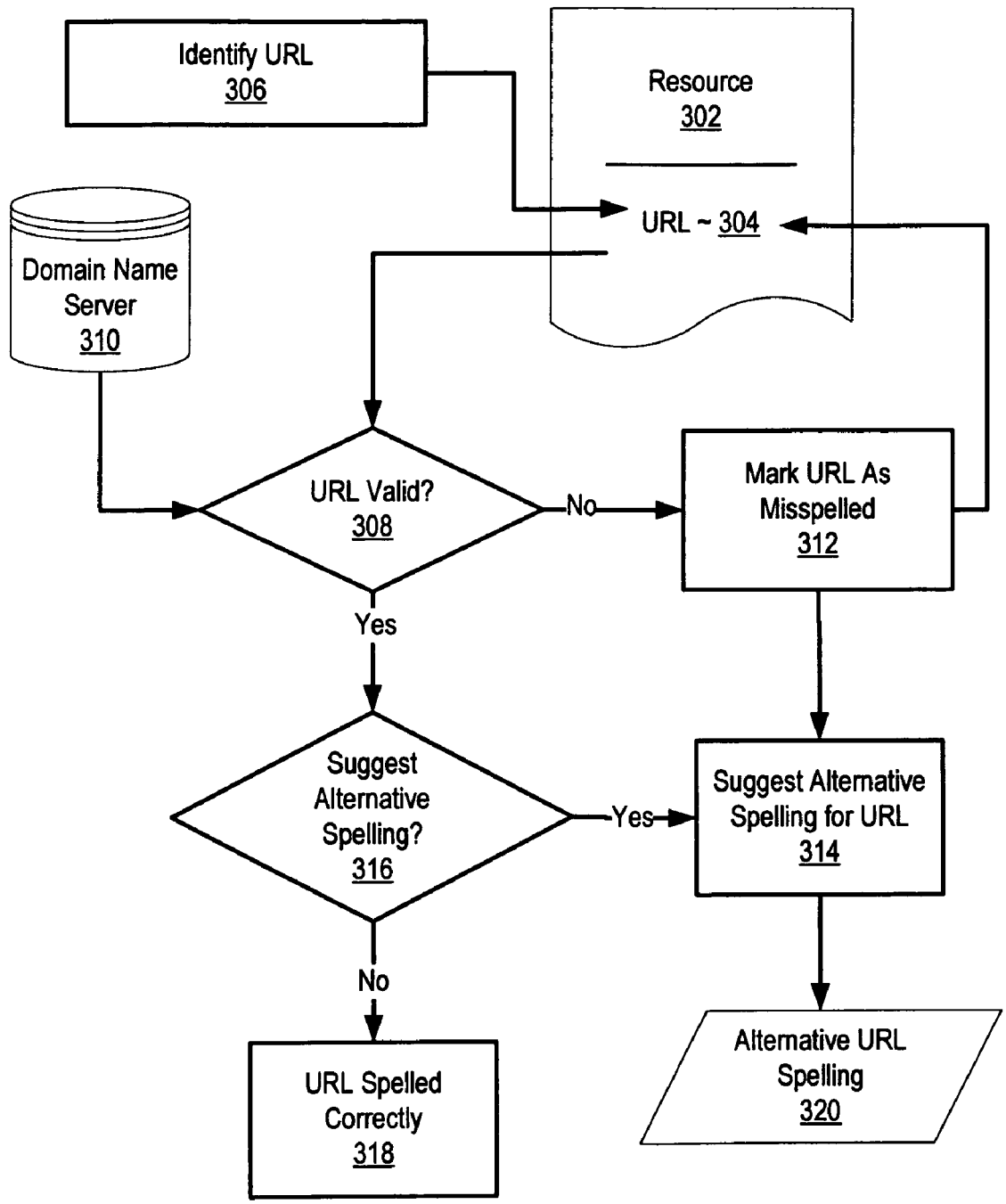
FIG. 3 sets forth a flow chart illustrating an exemplary method for spell checking URLs in a resource.

For further explanation, FIG. 3 sets forth a flow chart illustrating an exemplary method for spell checking URLs in a resource (302). The method of FIG. 3 includes identifying (306) within a resource (302) a URL (304). Methods for identifying (306) within a resource (302) a URL (304) will often vary depending upon the resource itself. That is, one method for identifying a URL in one type of resource may not be appropriate for identifying URLs in another type of resource. For example, one way identifying a URL within a markup document includes scanning the markup document for markup language elements consistent with hyperlinks. An anchor element is an example of a markup language element that identifies and implements a hyperlink. A common example form of an anchor element is:

<a href="http://www.ibm.com">Press Here For IBM</a>

This example anchor element includes a start tag <a>, and end tag </a>, an href attribute that identifies the target of the link as a web page identified by the URL http://www.ibm.com and an anchor. The "anchor" is the display text that is set forth between the start tag and the end tag. In this example, the anchor is the text "Press Here For IBM." The "anchor element" is the entire markup from the start tag to the end tag. Because hyperlinks are often used in markup documents to invoke URLs, scanning the markup document for markup language elements consistent with hyperlinks advantageously provides a vehicle for identifying a URL within a markup document.

Another way of identifying (306) within a resource (302) a URL (304) useful in identifying URLs in word processing documents or spread sheets includes scanning the document for the individual components of a URL. For further explanation of components of URLs consider the following exemplary HyperText Transfer Protocol ("HTTP") URL:

http://www.ibm.com/cgi/calendar.cgi

The component "http://" of the exemplary URL is called the 'scheme.' The scheme represents the protocol designated for the URL. The component "www.ibm.com" of the exemplary URL is called the 'host.' The host identifies the machine running a web server. The host can be a domain name or an IP address. Because IP addresses often change, hosts are often implemented with domain names. The component "cgi/calendar.cgi" of the exemplary URL is called a 'path' and identifies the location of the resource being requested, such as an HTML file or a CGI script. While the combination of individual components of URLs may vary from URL to URL, many components are common to many URLs. For example, the scheme "http://" is common to URLs using the HyperText Transfer Protocol.

After identifying a URL (304) within the resource (302), the method of FIG. 3 continues by determining (308) whether the URL (304) is valid. In the method of FIG. 3, determining (308) whether the URL (304) is valid is carried out by resolving a domain name contained in the URL. As discussed above, the Domain Name System ("DNS") is a name service typically associated with the Internet. The DNS translates domain names into network addresses. To resolve a domain name contained in the URL, a system routine called a 'resovler' accessible to a spell checker of the present invention submits a query to a DNS name server (310) containing the domain name identified in the URL (304). DNS includes a request/response data communications protocol with standard message types for resolving domain names. Gethostbyname( ) and InetAddress.getByName( ) are two examples of resolver API calls useful in resolving domain names that invoke a TCP/IP client in an operating system such as Unix or Windows. Such a TCP/IP client typically bears one or more predesignated DNS server addresses, designations of a primary DNS server for a computer and possibly one or more secondary DNS servers. In response to a call to a resolver function such as gethostbyname( ) and InetAddress.getByName( ), a TCP/IP client sends a DNS request message containing the domain name in a standard format to a predesignated primary DNS server requesting a corresponding network address. The DNS name server "resolves" the domain name to an IP address and sends the IP address back to the resolver as the "answer" to the query. The resolver passes the IP address to the calling spell checker.

If the domain name contained in the URL can be resolved to an IP address, in the method of FIG. 3, the domain name is valid. If the domain name contained in the URL can not be resolved to an IP address, in the method of FIG. 3, the domain name is invalid. If the URL is invalid, the method of FIG. 3 includes marking (312) the URL (304) as misspelled. Marking the URL as misspelled can be carried out in a number of ways. Such ways include highlighting the URL in a color predetermined to identify the URL as misspelled, displaying the URL in a font predetermined to identify the URL as misspelled, as well as others that will occur to those of skill in the art.

Providing an alternative spelling for a misspelled URL is often useful to users correcting misspelled URLs in resource. The method of FIG. 3 therefore also includes suggesting (314) an alternative spelling (320) for the URL (304). For further explanation, FIG. 4 sets forth a flow chart illustrating an exemplary method for suggesting an alternative spelling for the URL that includes identifying (404) a keyword (402) in the resource (302). One way of identifying (404) a keyword (402) in the resource (302) is carried out by scanning the document for words that have not been predetermined to be too commonly used to be useful as keywords. For example, the words 'a,' 'the,' 'from,' 'to' and many others are considered to commonly used to be useful as a keyword. Excluding these commonly used words from candidate keywords therefore increases the likelihood of identifying a useful keyword in the resource.

Figure 4:
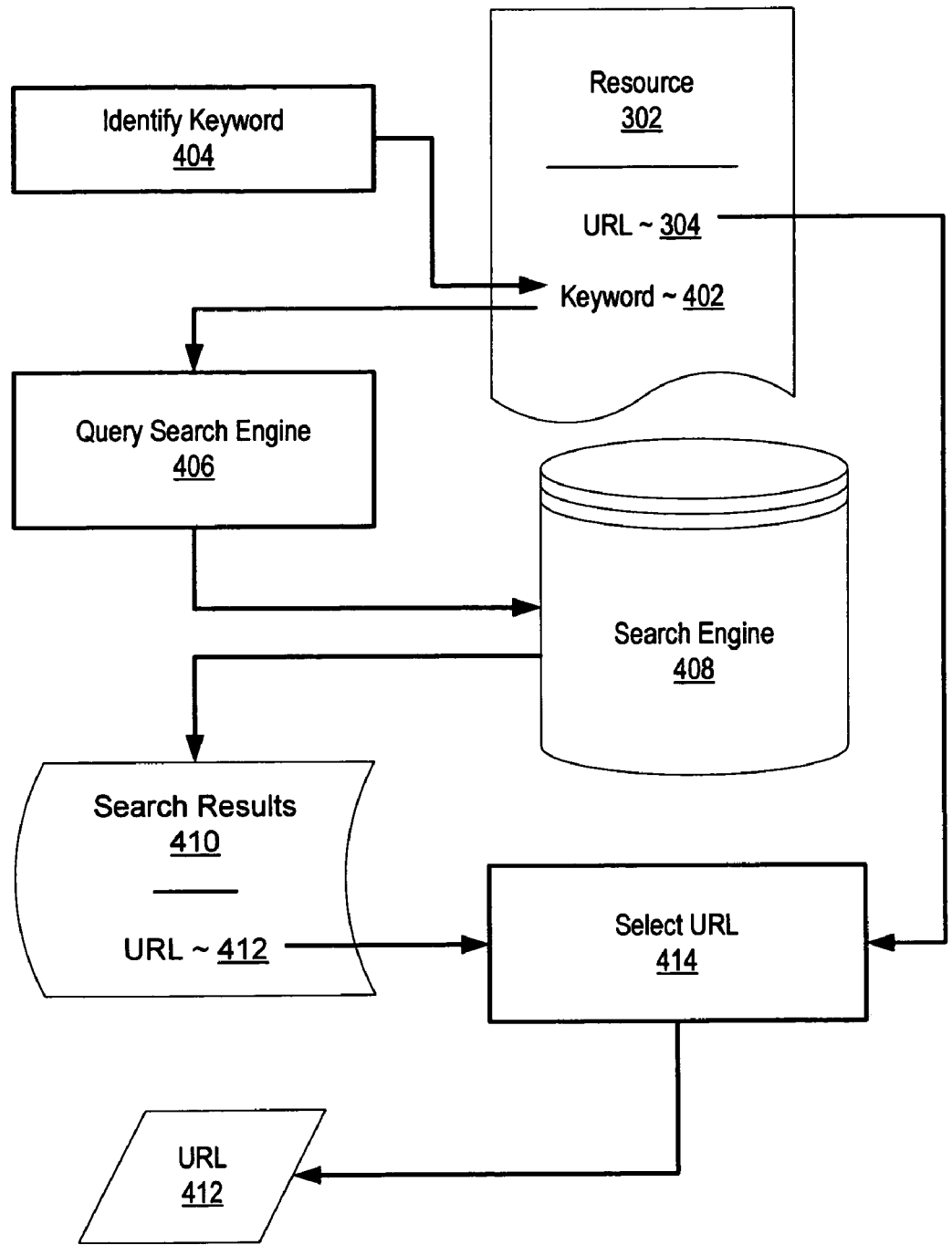
FIG. 4 sets forth a flow chart illustrating an exemplary method for suggesting an alternative spelling for the URL.

The method of FIG. 4 also includes querying (406) a search engine (408) with one or more of the identified keywords (402). Querying (406) a search engine (408) with one or more of the identified keywords (402) may be carried out by submitting keywords to a search engine as URL encoded data. "URL encoded data" is data packaged in a URL for data communications. In the case of HTTP communications, the HTTP GET and POST functions are often used to transmit URL encoded data. In this context, it is useful to remember that URLs do more than merely request file transfers. URLs identify resources on servers. Such resources may be files having filenames, but the resources identified by URLs also include, for example, queries to databases such as search engines. Results of such queries do not necessarily reside in files, but they are nevertheless data resources identified by URLs and identified by a search engine and query data that produce such resources. An example of URL encoded data for use in querying a search engine is:

http://www.google.com/cgi-bin/
MyScript.cgi?field1=computer&field2=ib.com

More specifically, the entire example above is a URL bearing the keyword "computer" and a misspelled URL "ib.com" as encoded data, and the encoded data is the string "field1=computer&field2=ib.com."

The method of FIG. 4 also includes selecting (414) a URL (412) in dependence upon search results (410) returned by the search engine (408) and the misspelled URL. Selecting (414) a URL (412) in dependence upon search results (410) returned by the search engine (408) and the misspelled URL typically includes selecting a URL returned by the search engine in dependence upon the keywords that most closely resembles the invalid and misspelled URL. For example, continuing with the example of misspelled URL "http://ib-.com," if a keyword search on the keyword "computer" returns a link to URLs "http://ibm.com" and http://computerstore.com, the URL http://ibm.com most closely resembles the misspelled URL and is selected according to the method of FIG. 4. The method of FIG. 4 advantageously provides a mechanism to suggest to users alternative spellings for misspelled URLs.

The method of FIG. 4 provides a mechanism to suggest to users alternative spellings for misspelled URLs that are clearly misspelled because domain names contained in the URL do not resolve to IP addresses. However, a URL may be valid and still be misspelled. Consider for example a user misspelling "http://www.ibm.com" by instead typing the URL "http://www.imb.com". Despite being a misspelled, a domain name contained in the misspelled URL can still be resolved to an IP address. That is, resolving "http://www.imb.com" returns an IP address and is valid. Spell checking URLs in accordance with the present invention, therefore provides a mechanism to address misspelled valid URLs.

Figure 5:
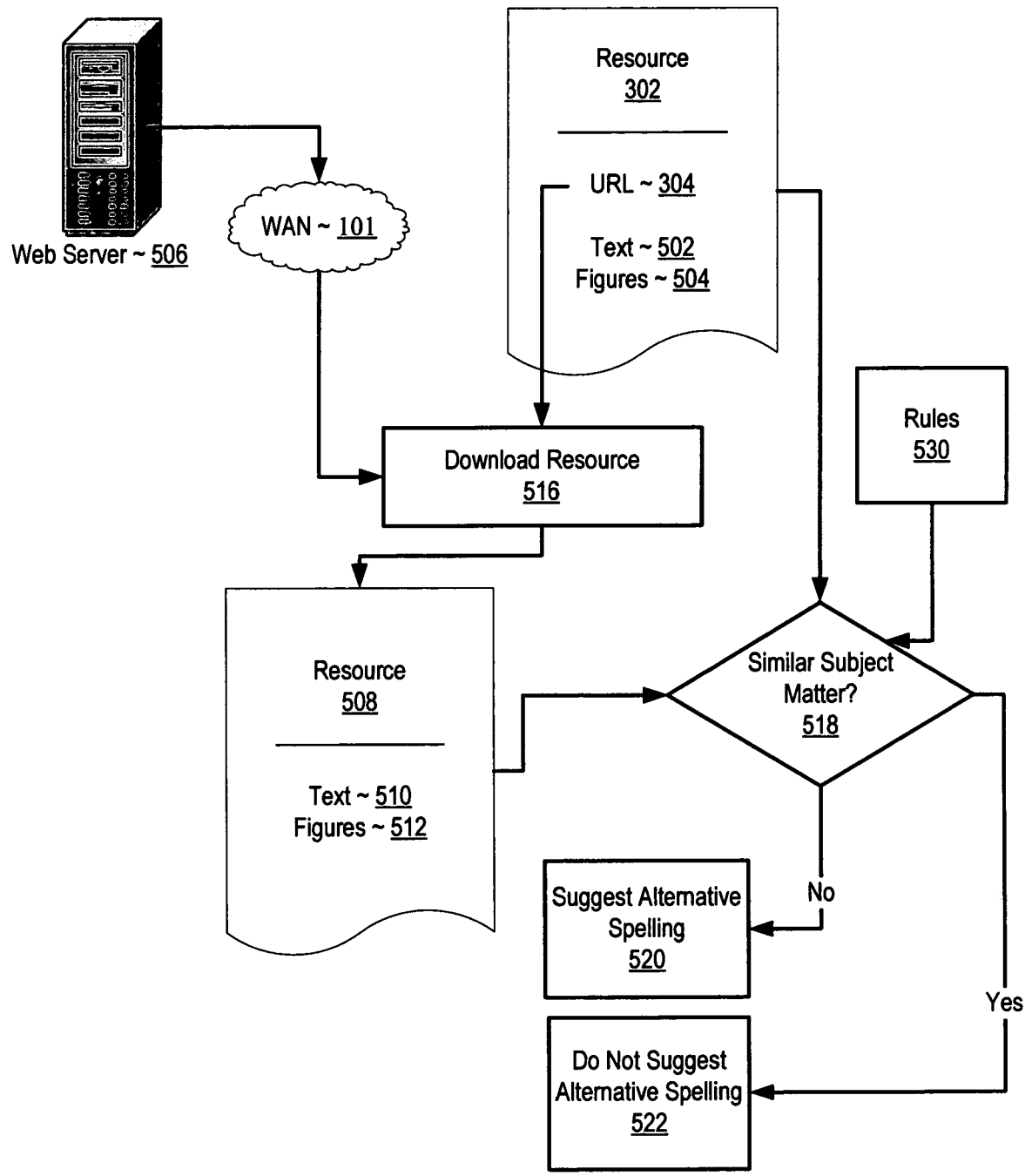
FIG. 5 sets forth a flow chart illustrating an exemplary method for determining whether to suggest an alternative URL.

Again with reference to FIG. 3: Spell checking URLs in accordance with the method of FIG. 3 also includes determining (316) whether to suggest an alternative URL even if the identified URL in the resource is valid. For further explanation, FIG. 5 sets forth a flow chart illustrating an exemplary method for determining whether to suggest an alternative URL. The method of FIG. 5 includes downloading (516) a resource (508) from a network address identified by the URL (304) and comparing (518) the downloaded resource (508) with the resource (302) containing the URL (304). In the method of FIG. 5, if the downloaded resource (508) and the resource (302) containing the URL (304) are directed toward similar subject matter, the URL is considered to be properly spelled and the method of FIG. 5 does not (522) suggest an alternative spelling for the URL. If the downloaded resource (508) and the resource (302) containing the URL (304) are not directed toward similar subject matter, the URL is considered to be misspelled and the method of FIG. 5 does (520) suggest an alternative spelling for the URL such as by use of the method of FIG. 4.

In method of FIG. 5, comparing (518) the downloaded resource (508) with the resource (302) containing the URL (304) is carried out by comparing the contents such as the text (510, 502) and Figures (512, 504) of each resource to determine whether the resources are directed toward similar subject matter. In method of FIG. 5, comparing (518) the downloaded resource (508) with the resource (302) containing the URL (304) includes using rules to compare the contents of the downloaded resource (508) with the contents resource (302) containing the URL (304). The exemplary rules (530) of FIG. 5 are criteria used to determine whether the downloaded resource (508) and the resource (302) containing the URL (304) are directed toward similar subject matter. For further explanation, consider the following exemplary rule:

> If downloaded resource and resource containing URL have 10 or more of the same words, excluding common words;
> Then downloaded resource and resource containing URL are directed toward similar subject matter;
> Else downloaded resource and resource containing URL are not directed toward similar subject matter.

In the example rule above, after excluding common words, the individual words of the downloaded resource and the resource containing the URL are compared to determine whether the two resources have 10 or more of the same words. If the resources have 10 or more of the same words, the exemplary rule dictates that the downloaded resource and the resource containing the URL are directed toward similar subject matter and the URL is therefore properly spelled and the method of FIG. 5 continues by not suggesting and alternative spelling. If the downloaded resource and the resource containing the URL do not have 10 or more of the same words, the exemplary rule dictates that the resources are not directed toward similar subject matter and the method of FIG. 5 continues by suggesting an alternative spelling for the URL. The exemplary rule is provided for explanation and not for limitation. In fact there are many ways of comparing (518) the downloaded resource (508) with the resource (302) containing the URL (304) to determine whether the resources are directed toward similar subject matter and all such ways are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for spell checking URLs in a resource, the method comprising:
   identifying within a resource a URL;
   determining whether the URL is valid; and
   if the URL is invalid, marking the URL as misspelled on a display device and suggesting an alternative spelling for the URL,
   wherein suggesting an alternative spelling for the URL comprises:
   identifying a keyword in the resource;
   querying a search engine with the identified keyword; and
   selecting a URL in dependence upon search results returned by the search engine; and
   if the URL is valid, determining whether to suggest an alternative URL,
   wherein determining whether to suggest an alternative URL if the URL is valid further comprises:
   downloading a resource from a network address identified by URL; and
   comparing the downloaded resource with the resource containing the URL.

2. The method of claim 1 wherein determining whether the URL is valid further comprises resolving a domain name contained in the URL.

3. A system for spell checking URLs in a resource, the system comprising:
   means for identifying within a resource a URL;
   means for determining whether the URL is valid; and
   means for marking the URL as misspelled on a display device and means for suggesting an alternative spelling for the URL if the URL is invalid,
   wherein means for suggesting an alternative spelling for the URL comprises:
   means for identifying a keyword in the resource;
   means for querying a search engine with the identified keyword; and
   means for selecting a URL in dependence upon search results returned by the search engine; and
   means for determining whether to suggest an alternative URL if the URL is valid;
   wherein means for determining whether to suggest an alternative URL if the URL is valid further comprises:
   means for downloading a resource from a network address identified by URL; and
   means for comparing the downloaded resource with the resource containing the URL.

4. The system of claim 3 wherein means for determining whether the URL is valid further comprises means for resolving a domain name contained in the URL.

5. A computer program product for spell checking URLs in a resource, the computer program product comprising:
   a recording medium;
   means, recorded on the recording medium, for identifying within a resource a URL;
   means, recorded on the recording medium, for determining whether the URL is valid; and
   means, recorded on the recording medium, for marking the URL as misspelled on a display device and means, recorded on the recording medium, for suggesting an alternative spelling for the URL if the URL is invalid,
   wherein means, recorded on the recording medium, for suggesting an alternative spelling for the URL comprises:
   means, recorded on the recording medium, for identifying a keyword in the resource;
   means, recorded on the recording medium, for querying a search engine with the identified keyword; and
   means, recorded on the recording medium, for selecting a URL in dependence upon search results returned by the search engine; and
   means, recorded on the recording medium, for determining whether to suggest an alternative URL if the URL is valid,
   wherein means, recorded on the recording medium, for determining whether to suggest an alternative URL further comprises:
   means, recorded on the recording medium, for downloading a resource from a network address identified by URL; and
   means, recorded on the recording medium, for comparing the downloaded resource with the resource containing the URL.

6. The computer program product of claim 5 wherein means, recorded on the recording medium, for determining whether the URL is valid further comprises means, recorded on the recording medium, for resolving a domain name contained in the URL.

* * * * *